Aug. 23, 1932.  I. M. SCHWAB  1,873,338
EYEGLASSES
Filed March 28, 1930
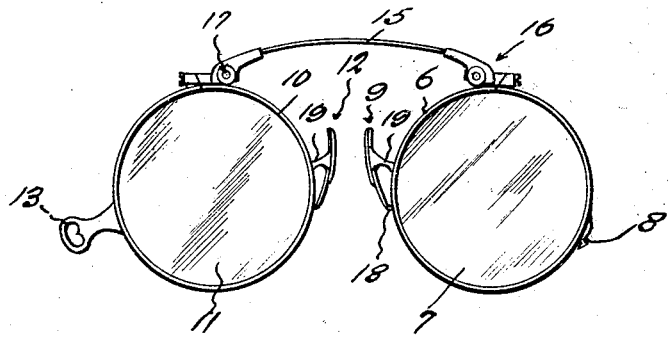
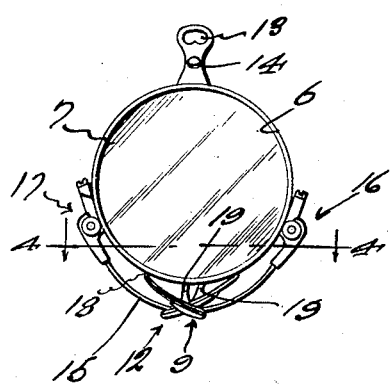
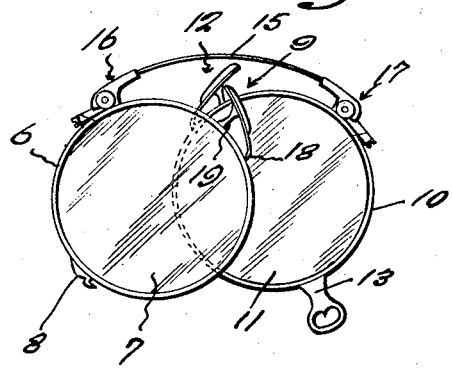
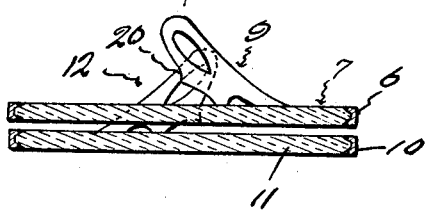
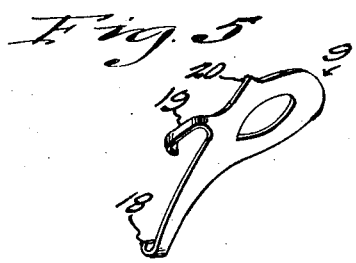
Inventor
I. M. Schwab
By Clarence A. O'Brien
Attorney Patented Aug. 23, 1932

1,873,338

UNITED STATES PATENT OFFICE

ISAAC M. SCHWAB, OF SAVANNAH, GEORGIA

EYEGLASSES

Application filed March 28, 1930. Serial No. 439,659.

This invention relates to certain structural improvements and refinements embodied in folding eyeglasses of a type wherein the companion lenses, when in a collapsed state, swing into overlapping spaced parallelism for compactness and convenience in carrying.

The construction herein shown and described is analogous to and an improvement upon the folding eyeglasses disclosed in Patent 1,016,153, granted to E. P. Hutten and J. MacDougall under date of January 30, 1912.

Briefly stated, the prior art patent mentioned comprises a pair of eyeglasses characterized by companion lenses, frames for holding the lenses, a spring pivotally connected at its ends with said frames at the top portions thereof, posts on the lens carrying frames, wherein said posts project toward each other, and nose clips mounted on said posts and projecting in the same direction and being outside of the plane of the frames.

The spring is of such length and the clips are so arranged relatively to one another that the clips pass one another on swinging of one lens frame toward and over the other to fold the frames one upon the other.

An object of the invention herein shown and described is to generally improve upon the patented structure, the principal improvements being founded upon the nose guards or clips.

Another object is predicated upon the provision of new and improved folding eyeglasses provided with unique and ornamental nose guards which are so shaped and arranged as to permit folding one lens over the other without hindrance and without unduly straining and distorting the arched connecting spring.

In carrying the present guard construction into practice, I have found it expedient and practical to impart a distinctive shape to each guard and to construct the guard in such a manner as to permit it to be more rigidly fastened to the frame, whereby to acquire dependable balancing of the lenses, to insure efficient maintenance of the glasses on the nose, and to promote simplicity, convenience and comfort.

Other distinguishable features and advantages will become more readily apparent from the following description and drawing.

In the drawing:

Figure 1 is a front elevational view of the improved eyeglasses showing the lenses in normal wearing position with respect to each other.

Figure 2 is an inside elevational view showing the lenses partly folded and emphasizing the clearance and co-operative relationship between the nose guard during this time.

Figure 3 is a top plan view showing the eyeglasses completely folded for carrying.

Figure 4 is an exaggerated sectional view taken approximately on the plane of the line 4—4 of Figure 3.

Figure 5 is an unusually exaggerated perspective view of one of the nose guards showing the configuration and construction of the portions thereof.

Directing attention first to Figure 1, it will be seen that the ordinal 6 designates the right hand frame carrying the complemental lens 7. This frame is provided on its periphery at a predetermined point with a notched enlargement defining a keeper as at 8.

On the inner periphery of the frame is one of the improved nose guards indicated at 9.

The left hand frame is distinguished by the numeral 10 and the lens is represented at 11. The co-acting guard is represented at 12 and located opposite the first named guard 9, both guards being rigidly mounted on the respective rim or frame.

The numeral 13 designates a radially projecting handle which is constructed with a kerf for reception of the aforesaid keeper 8 and is also provided with a spring-pressed retaining latch and an operating button 14 as shown in Figure 3. This means for retaining the lenses and frames in overlapping relationship is of no consequence and may be of any suitable construction. No claim is made therefor.

The numeral 15 designates the nose bridge which is here shown in the nature of a longitudinally bowed and suitably curved flat spring fastened at 16 to the frame 6 and as at 17 to the frame 10. These features 15, 16 and 17 are well known in the art.

It is evident that the primary novelty in the present construction is predicated upon the co-operative relationship and shape of the nose guards 9 and 12 respectively. Each guard is the same in shape and a description of one will suffice for both. Referring for instance to Figure 5, it will be seen that the guard is of general triangular configuration and the apex end is curled as at 18 to permit it to be fastened to the complemental frame.

Intermediate the ends of the guard is a peculiarly shaped attaching arm 19 which is also securely fastened to the frame. This provides a two-point rigid connection for the guard and disposes the guard in proper laterally positioned relationship to the frame. Particularly do I wish to call attention to the numeral 20 which designates a projection which functions as a fulcrum as well as a cam during the folding of the lenses one over the other as seen for example in Figure 2.

It is obvious that by narrowing the attached ends of the guards, the desired degree of clearance is provided during the opening and closing of the lenses. In fact, the shape of the guards is such as to accomplish this result without interference or without permitting one guard to hang on the other. Moreover, as the guards are brought into the folding relationship seen in Figure 2, the projection 20 on the guard 12 fulcrums and rides against the complemental face of the guard 9 in such a manner as to facilitate latching and when the lenses are completely folded, the guards are nested into each other in such a manner as to space the glass lenses from each other completely throughout their area to avoid scratching.

This is a new principle in nose guard construction. Not only do the guards come together in this peculiar cooperative relationship for spacing the lenses apart, but they so co-act as to relieve the bow spring 15 of undue strain, thereby minimizing distortion of this spring. In this guard arrangement it will be noticed that the two-point connection between the guard and the frame provides a substantially V-shaped clearance space and also disposes the guards in proper angular relationship and in a convenient nose gripping plane with respect to the lenses.

Not only are these guards practical for utilitarian purposes, but they are attractive and lend individuality in appearance and ornamentation to the complete eyeglass structure.

Despite the fact that the drawing illustrates folding eyeglasses and the description is directed to the construction of glasses of this specific construction, I wish to emphasize the fact that the nose guards may be embodied in the construction of various forms of eyeglasses whether they be of the spectacle or folding type.

The foregoing and other commercial features and advantages of the improved guard construction will be evident to persons skilled in the art to which the invention relates. In view of this, a more lengthy description is regarded as unnecessary.

It is understood that minor changes in shape, size, and materials and rearrangements of the details such as fall within the meaning and scope of the following claims may be resorted to in actual practice if desired.

I claim:

1. A nose piece for the lens of an eyeglass, comprising a metallic piece having an elongated portion tapering toward one end and provided at said end with a return bend for engagement with the lens frame, said piece intermediate its ends provided with an extension projecting in a plane at substantially right angles to the plane of the piece, said projection at its free end being bent laterally for engagement with the lens frame remote from said end of said elongated portion.

2. A pair of eyeglasses including in combination, a pair of complemental lens frames capable of being folded in overlapping relation with respect to one another, a nose piece for each of said lens frames and including a relatively flat piece longitudinally curved, said piece being relatively large at one end and tapering gradually from an intermediate portion of the piece to the opposite end of the piece and being provided at said last mentioned end with a return bend for engagement with the lens frame, said piece intermediate its ends provided with a projection integral with one edge thereof and projecting in a plane at substantially right angles to the plane of said piece, said projection at the free end thereof adapted to engage the lens frame with said piece in a plane at substantially right angles to the plane of the lens frame, and said piece at the enlarged end portion thereof and at said one edge provided with an integral projection in the plane of said piece.

In testimony whereof I affix my signature.

ISAAC M. SCHWAB.